UNITED STATES PATENT OFFICE.

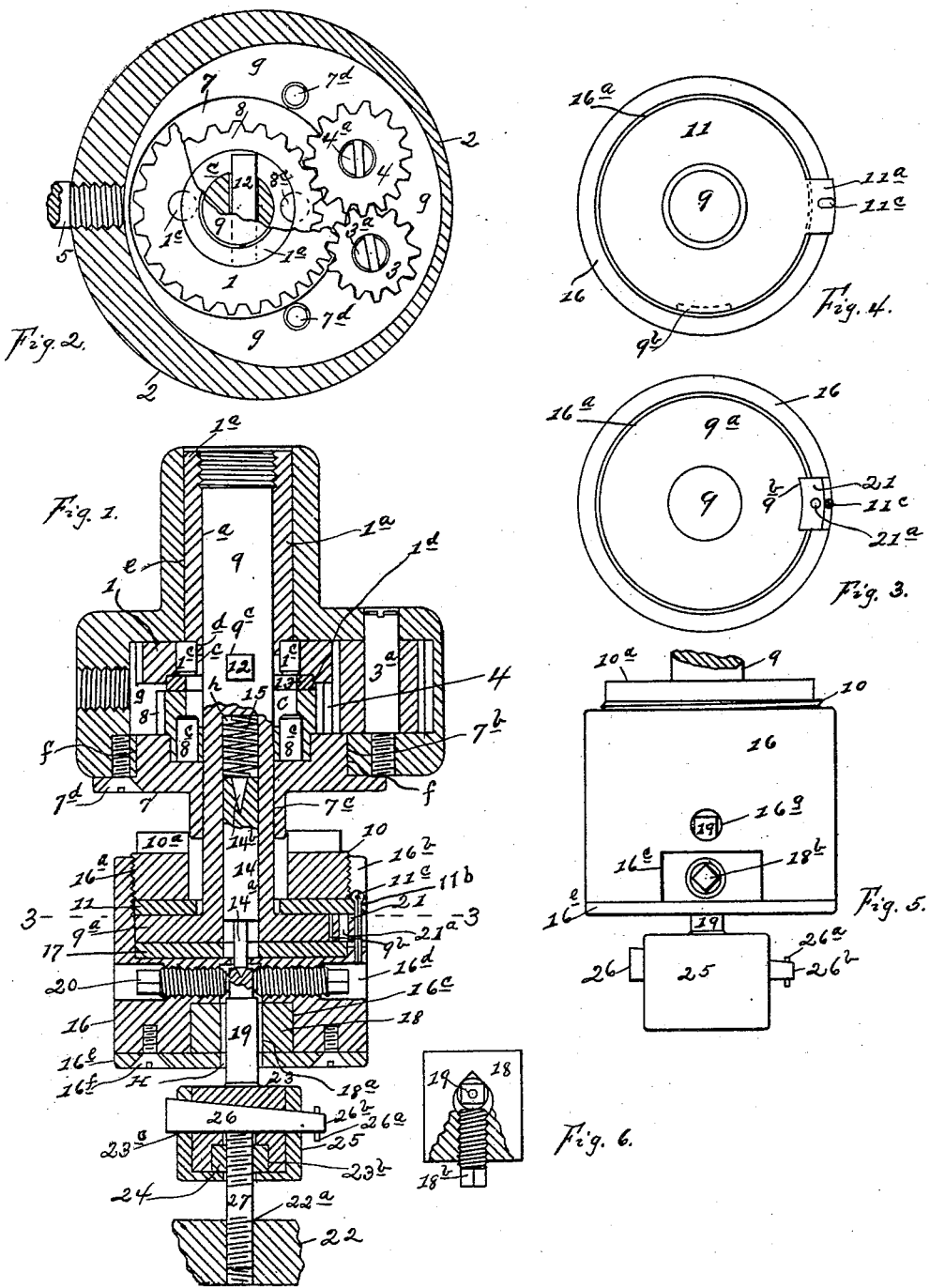

FRANKLIN A. ERRINGTON, OF NEW YORK, N. Y.

STUD-SETTING MACHINE.

SPECIFICATION forming part of Letters Patent No. 632,812, dated September 12, 1899.

Application filed March 17, 1899. Serial No. 709,411. (No model.)

*To all whom it may concern:*

Be it known that I, FRANKLIN ALFRED ERRINGTON, a citizen of the United States, residing in New York city, borough of Richmond, (Stapleton P. O.,) State of New York, have invented certain new and useful Improvements in Stud-Setting Machines, of which the following is a specification.

My invention relates to means for rotating a spindle in opposite directions; to means for assuring the absolute alinement and maximum rigidity of the bearings for said oppositely-rotative spindle; to means for centering and alining a tool or holder with said spindle; to means for connecting and disconnecting a stud or tap or similar tool with said spindle; to means for rendering the connection between said spindle and stud either a positive or a frictional one at will, and to other details of improvement and combinations of parts hereinafter described and then pointed out in the claims.

Reference is to be had to the accompanying drawings, forming part hereof, wherein—

Figure 1 is a vertical longitudinal section of a machine embodying my invention. Fig. 2 is a plan view of Fig. 1 with the case shown in section and the driving wheel and spindle partly broken to show the top of reversing-wheel and the clutches. Fig. 3 is a top plan view of the friction driving and driven disks on the line 3 3 of Fig. 1, the check-washer and adjusting-nut being removed and the positive locking-block in operative position. Fig. 4 is a similar view to Fig. 3, except that the check-washer is interposed and the dotted lines show the positive locking-block in inoperative position. Fig. 5 is a front elevation of Fig. 1, showing the tool-holder and stud-setter only. Fig. 6 is a top plan view of the alining-piece.

A driving-wheel 1, having gear-teeth upon its periphery, is shown provided with integral hub $1^a$, projecting from its outer face, said wheel and hub having an axial bore $a$, screw-threaded at its outer end to afford connection with any suitable power and counterbored at its inner end to form a clutch-chamber $c$ within the plane of the inner face of wheel 1, said clutch-chamber being provided with clutch-pin bearings $d$, in which are located clutch-pins $1^c$. The diameter of hub $1^a$ and the distance between centers of the clutch-pin bearings $d$ are so proportioned that said bearings $d$ open upon the outer face of wheel 1 to enable clutch-pins $1^c$ located therein to be driven out.

The case 2 is preferably shown with integral top, base, and side plates, and having a bearing-aperture $e$ in which the hub $1^a$ is journaled. A double-depth transmitting-pinion 3 is preferably journaled on a stud $3^a$ and provided with gear-teeth upon its periphery that mesh with the teeth of driving-wheel 1. A reversing-pinion 4 is preferably journaled on a stud $4^a$ and provided with gear-teeth that mesh with those of transmitting-pinion 3, said pinion being shown double depth to enable it to mesh with wheel 1 and with pinion 4. Each of said studs is supported in both the top and the bottom plates of case 2. The periphery of case 2 is preferably circular, and the gear-chamber $g$ is shown eccentric to the periphery of said case to provide at one side a space for pinions 3 4 with a thin side wall and at the other side a thick wall to receive the strain of a reverse-rod 5, said rod being adapted to be suitably held from rotation to prevent the rotation of case 2. Case 2 is also provided with an opening $f$ into its gear-chamber $g$, said opening being opposed to said bearing-aperture $e$ in its top plate and of sufficient diameter to permit the insertion of wheel 1, whereby said wheel 1 is permitted to have its hub $1^a$ integral. The inner surface of the top plate of case 2 can be faced off at right angles to the bearing-aperture provided therein for hub $1^a$ at the same setting in the lathe that the bearing-aperture is bored, making an absolutely-accurate bearing-surface for the outer face of wheel 1, and the alinement and rigidity of the whole device is assured, this improvement being the result of years of research in endeavoring to overcome the defects of previous constructions.

The clutch-pins $1^c$ are shown projecting into clutch-chamber $c$ of wheel 1 laterally from its side walls and longitudinally from its face, part of the periphery of said pins being preferably embedded in the side wall of said clutch-chamber to support each of said pins on the side opposite to its clutch-face. A bushing or cover 7 is shown provided with an axial bore $7^c$. The inner face of bushing or cover 7 is preferably provided with an inner hub $7^b$, fitting the case-opening $f$, and the inner end of axial bore $7^c$ is shown counterbored to receive the hub of a reversing-wheel 8, having an axial bore registering with bore $7^c$ and counterbored at its inner end to form a clutch-chamber $c$, into which project clutch-pins $8^c$. The periphery of reversing-wheel 8 is provided with gear-teeth adapted to mesh with the gear-teeth of reversing-pinion 4 when reversing-wheel 8 is in operative position, by which means the wheel 8 will be rotated simultaneously in the opposite direction to wheel 1 through the medium of pinions 3 and 4. A spindle 9 is shown provided with a flange or friction driving-disk $9^a$, preferably having a radial slot $9^b$ cut in its periphery. An externally-screw-threaded adjusting-nut 10 encircles the spindle 9 and is provided with means, as $10^a$, for connection with a wrench or similar tool.

Between flange $9^a$ and nut 10 I interpose a check-washer 11, having a lug $11^a$ projecting from its periphery, and I preferably perforate said lug at $11^b$. Spindle 9 is passed through the axial bore $7^c$ of bushing or cover 7 and reversing-wheel 8, and a clutch-bar 12 is inserted in a transverse bore $9^c$ in spindle 9. A thrust-ring 14 is interposed between the inner faces of the driving and reversing wheels, the inside diameter of said thrust-ring preferably being of the same diameter and registering with the clutch-chamber $c$ to enable the clutch-bar 12 to rotate and have longitudinal movement independently of said thrust-ring. Said thrust-ring 13 is preferably held in said position by fitting into a recess $1^d$ in the inner face of driving-wheel 1. The aforesaid parts are held in operative position by securing the bushing or cover 7 in case 2 by screws or other suitable means $7^d$. The height of the clutch-bar 12 is less than the distance between the opposed ends of the clutch-pins $1^c$ $8^c$ to enable the operator to stop the rotation of spindle 9 during the continued rotation of driving-wheel 1 by bringing said clutch-bar 12 in said intermediate position.

The spindle 9 is provided with an axial bore $h$, in which is located an axially-movable reversible center piece 14, and I preferably provide a spiral spring 15 to actuate said center piece axially. A friction-driven body 16 is provided at one end with a screw-threaded recess $16^a$, whose side walls surround said flange $9^a$ and mesh with the adjusting-nut 10. The side wall of said screw-threaded recess is provided with a radial slot $16^b$ to receive the lug $11^a$, said slot being of sufficient longitudinal depth to enable said lug to connect said disks 11 and 16 together to rotate in unison by a slip-joint that permits of their moving independently to and from each other, and thereby prevents the slipping of driving friction-disk $9^a$ between friction-driven disks 11 and 16, affecting the tension of the frictional contact of said disks $9^a$, 11, and 16.

A friction-washer 17 is preferably interposed between the disks $9^a$ and 16, said washer 17 being provided with an axial bore that registers with and is preferably of the same diameter as spindle-bore $h$. This arrangement by which the two friction-driven disks 11 and 16 are connected to rotate together and to carry with them the adjusting-ring 10 permits said adjusting-ring to cease to rotate under excessive strain, and thereby to enable the adjustment of the tension to be made without stopping the rotation of spindle 9 and disk $9^a$.

The body 16 is provided with an axial socket H, that registers with the axial bore $h$ of the spindle 9, and I form an abutment in the side wall of said axial bores $h$ H, preferably by reducing the diameter of said bores at their juncture to less than the extreme diameter of center piece 14. Center piece 14 is provided at one end with a concave center $14^b$ and at the other end with a convex center $14^a$ to render said center piece reversible and is preferably reduced in diameter for some distance above said convex center $14^a$ to enable the tool-holder shank 19 it centers to be considerably varied in its projection from body 16, and I supply a series of gripping means at different distances along said socket by providing said body 16 with two sets of transverse bores $16^c$ $16^d$ on different planes. The outer of said transverse bores $16^c$ is shown smooth to receive a sliding alining-piece 18, perforated by a socket $18^a$ and provided with a clamping-screw $18^b$. The transverse bore $16^c$ is preferably shown in the form of a slot cut in the end of body 16 and inclosed by a face-plate $16^e$, which is attached to body 16 by screws $16^f$ or similar means. The alining-piece 18 is a sliding fit along bore $18^a$ transversely of body 16, the face-plate $16^e$ operating to prevent alining-piece 18 moving longitudinally of body 16. The inner of said transverse bores $16^d$ is shown screw-threaded on each side of its intersection with the axial bore H to mesh with set-screws 20, whose outer ends are shown provided with suitable means for connection with a wrench or similar tool, for which purpose said screw-threaded bores are shown counterbored at their outer ends. In order to see laterally into body 16 to ascertain the relative positions of the tool-holder shank 19 and the set-screws 20, I provide a lateral sight aperture or apertures $16^g$ into the socket H above the alining-piece 18, and I have preferably shown said aperture or apertures $16^g$ on the same plane and at right angles to set-screws 20.

A positive locking-block 21 can be inserted laterally (see Figs. 1 and 3) through slot $16^b$ and mesh with slot $9^b$, said block being held in operative position by a pin $11^c$, inserted through perforation $11^b$ in lug $11^a$ and preferably having its end supported in an aperture formed in the opposing bottom of slot $16^b$. This arrangement renders the device positive in its action. To render the device frictional in its action, the positive locking-block 21 can be withdrawn from slot 9ᵇ (see Fig. 4) and held out of mesh therewith by pin 11ᶜ, meshing with aperture 21ᵃ in said block.

A stud-setter is provided with a body 23 and a shank 19 to connect said body with socket-piece 18, and through its connections with spindle 9, the stud-holder 23 being brought in axial alinement and held concentrically therewith by means of the center piece 14 engaging the center hole of shank 19, as above described. Said body 23 is provided with an axial bore 23ᵇ, opening into a transverse bore 23ᶜ. The lower portion of axial bore 23ᵇ is shown enlarged and provided with parallel walls on two sides to receive stud-nut 24, having a screw-threaded axial bore. To hold said stud-nut in the enlarged portion of bore 23ᵇ, I inclose the body 23 in a cup-shaped cover 25, having an axial bore registering with bore 23ᵇ and transverse bores registering with bore 23ᶜ. The bore 23ᶜ is preferably tapered throughout its length through cover 25 and body 23, the lower wall of bore 23ᶜ being preferably at right angles to the axis of body 23. To provide a suitable slip surface above stud-nut 24, I drive a tapered pin 26 into said tapered bore 23ᶜ and prevent said tapered pin or wedge 26 from being driven out of bore 23ᶜ by a transverse pin 26ᵃ. A stud 27 is screwed through stud-nut 24 and abuts against wedge 26 and is driven rigidly with body 23, the stud-nut 24 being provided with parallel sides fitting closely between the parallel walls of the lower portion of bore 23ᵇ to prevent stud-nut 24 rotating independently on body 23, and the ends of stud-nut 24 being fitted between the walls of the cover 25 to register the screw-threaded bore of said stud-nut with the bore 23ᵇ. The surface of wedge 26 is exposed within the bore 23ᵇ to directly engage the top of stud 27, and it is important that the plane of said exposed surface of wedge 26 should be at right angles to the axis of stud 27 to secure proper coaction of the parts.

The operation of the parts is as follows: The wheel 1 being rotated by suitable rotative means and the case 2 being suitably held from rotation by rod 5 upon presentation of work 22 against the stud 27 the spindle 9 will slide inwardly along its bearings until the clutch-bar 12 engages the face of clutch-chamber c of wheel 1, when the parts of the device will be in the position illustrated in the drawings, except that the stud 27 will only be at the entrance of hole 22ᵃ in work 22. The device being shown in its positive condition, it will be understood that the stud 27 will be rotated in the same direction with wheel 1 through the medium of clutch-pins 1ᶜ and clutch-bar 12. When the stud 27 is set to the desired depth, the work is withdrawn from the device, pulling the clutch-bar 12 out of engagement with clutch-pins 1ᶜ. The wedge 26 is struck on its end 26ᵇ to move said wedge laterally of body 23 to release the tension of the meshing threads of nut 24 and stud 27, whereupon the work is withdrawn farther from the device to pull the clutch-bar 12 into engagement with the clutch-pins 8ᶜ, which are rotated in the opposite direction by wheel 3 and back stud-nut 25 off from stud 27, leaving the latter firmly set in the work 22.

Should the hole 22ᵃ not go through the work 22 and should it be desired to set the stud 27 therein by friction, the positive locking-block 21 would be withdrawn from the radial spindle-slot 9ᵇ, whereupon the nut 10 would be adjusted in body 16 to bring the tension of the frictional contact of disks 9ᵃ, 11, and 16 to a degree sufficient to rotate stud 27 under normal strain and yet permit disk 9ᵃ to slip between disks 11 and 16 when the strain should endanger the breakage of stud 27 or when said stud 27 should encounter the assumed bottom of hole 22ᵃ.

Having now described my invention, what I claim is—

1. The combination of a case having integral top, base and side plates and provided with an opening in its base-plate opposed to a bearing-aperture in its top plate, a driving-wheel adapted to pass through said base-plate opening and having an integral hub journaled in said top-plate bearing-aperture, a spindle, mechanism to rotate said spindle independently of said wheel, and an externally-inserted cover for said base-plate opening provided with a spindle-bearing in line with said top-plate bearing-aperture, substantially as described.

2. The combination with a case having integral top, base and side plates and provided with an opening in its base-plate opposed to a bearing-aperture in its top plate, of a driving-wheel adapted to pass through said base-plate opening and suitably journaled in said bearing-aperture, a reversing-wheel journaled in line with said driving-wheel, each of said wheels being provided with a clutch, a spindle journaled axially of said wheels and provided with a clutch to engage either of said wheel-clutches, gearing carried by said case and adapted to rotate one of said wheels in the opposite direction to the other thereof, and an externally-inserted cover for said base-plate opening provided with a spindle-bearing in line with said top-plate bearing-aperture, substantially as described.

3. The combination with a case having integral top, base and side plates and provided with an opening in its base-plate opposed to a bearing-aperture in its top plate, of a driving-wheel adapted to pass through said opening and suitably journaled in said bearing-aperture, a reversing-wheel journaled in line with said driving-wheel, each of said wheels being provided with a clutch, a spindle journaled axially of said wheels and having a clutch adapted to engage either of said wheel-clutches, a reversing-pinion meshing with said reversing-wheel, a transmitting-pinion meshing with said driving-wheel and with said reversing-pinion, and an externally-inserted cover for said base-plate opening provided with a spindle-bearing in line with said top-plate bearing-aperture, substantially as described.

4. The combination with a case having integral top, base and side plates and provided with an opening in its base-plate opposed to a bearing-aperture in its top plate, of a driving-wheel adapted to pass through said opening and suitably journaled in said bearing-aperture, a reversing-wheel journaled in line with said driving-wheel, each of said wheels being provided with a clutch, a spindle journaled axially of said wheels and having a clutch adapted to engage either of said wheel-clutches, a reversing-pinion meshing with said reversing-wheel, a transmitting-pinion meshing with said driving-wheel and with said reversing-pinion, the axles of said pinions being supported in both the top and the base plates of said case, and an externally-inserted cover for said base-plate opening provided with a spindle-bearing in line with said top-plate bearing-aperture, substantially as described.

5. The combination with a case having integral top, base and side plates and provided with an opening in its base-plate opposed to a bearing-aperture in its top plate, said case having its gear-chamber eccentric to its periphery to provide a thick wall at one side thereof, a spindle, mechanism to rotate said spindle and adapted to pass through said base-plate opening, and an externally-inserted cover for said base-plate opening provided with a spindle-bearing in line with said top-plate bearing-aperture, substantially as described.

6. The combination of a case having integral top, base and side plates and provided with an opening in its base-plate that is concentric with a bearing-aperture in its top plate, the gear-chamber of said case being eccentric to the periphery thereof, a spindle, mechanism to rotate said spindle and adapted to pass through said base-plate opening, and an externally-inserted cover for said base-plate opening provided with a spindle-bearing in line with said top-plate bearing-aperture, substantially as described.

7. The combination with a case having integral top, base and side plates and provided with an opening in its base-plate opposed to a bearing-aperture in its top plate, the gear-chamber of said case being eccentric to the periphery thereof to provide at one side of said case a thick wall to receive a reverse-rod, of a driving-wheel adapted to pass through said opening in said base-plate and suitably journaled in said bearing-aperture in said top plate, a reversing-wheel journaled in line with said driving-wheel, each of said wheels being provided with a clutch, a spindle having a clutch adapted to engage either of said wheel-clutches gearing carried by said case and adapted to rotate one of said wheels in the opposite direction to the other thereof, and an externally-inserted cover for said base-plate opening provided with a spindle-bearing in line with said top-plate bearing-aperture, substantially as described.

8. The combination with a case having integral top, base and side plates and an opening into its gear-chamber, of a driving-wheel adapted to pass through said opening and suitably journaled in said top plate, a reversing-wheel having a hub extending from its outer face, each of said wheels being provided with a clutch, a spindle having a clutch adapted to engage either of said wheel-clutches, and a bushing provided with a spindle-bore that is counterbored at its inner end to provide a bearing for said hub of said reversing-wheel, substantially as described.

9. The combination of a body having an axial bore to receive a tool and a transverse bore intersecting said axial bore, a center piece movable axially of said body in said axial bore, an alining-piece pierced by an alining-socket and movable laterally of said body in said transverse bore and provided with a clamping-screw, a plurality of set-screws movable laterally of said body, the opposed inner ends of said set-screws being adapted to enter said axial bore to engage said tool, and means to limit the outward axial movement of said center piece and permit said center piece and said alining-piece to move axially and laterally respectively independently of each other, substantially as described.

10. The combination of a body having a socket to receive a tool and provided in the outer portion thereof with means to grip and aline said tool, and a plurality of set-screws movable laterally of said body in radial screw-threaded bores opening into the inner portion of said socket, the inner ends of said set-screws being opposed and adapted to engage said tool, said body being provided with a sight-opening intersecting said socket at its juncture with said radial screw-threaded bores and passing laterally through said body, substantially as described.

11. The combination of a driving friction-disk and a friction-driven body, means to adjust the tension of the frictional contact of said disk and body, means to preserve said tension at the degree adjusted, said disk and said body being each provided with a radial aperture, a positive locking-block externally inserted radially of said disk and body into said radial apertures thereof, and means to connect a tool with said body, substantially as described.

12. The combination of a friction-disk having an indenture in its periphery, a screw-threaded adjusting-nut, a body having one of its ends provided with a screw-threaded bore to receive said disk and adapted to mesh with said nut to adjust the tension of the frictional contact of said disk and body, means to preserve said tension at the degree adjusted, said body having an indenture in its periphery, a positive locking-block externally inserted radially of said disk and body in said peripheral indentures thereof to mesh simultaneously therewith, and means to connect a tool with said body, substantially as described.

13. The combination with a body having an axial bore provided with screw-threads to mesh with a stud, said body also having a transverse bore opening into said axial bore, of a wedge located in said transverse bore and having its surface exposed within said axial bore to directly engage said stud, the plane of said exposed wedge-surface being at right angles to the axis of said body, substantially as described.

14. The combination with a body having an axial bore provided with screw-threads to mesh with a stud, said body also having a transverse bore opening into said axial bore, the plane of the lower wall of said transverse bore being at right angles to the axis of said body and the plane of the upper wall of said transverse bore being at an oblique angle to the axis of said body, and a wedge movable laterally of said body in said transverse bore and having its surface exposed within said axial bore to directly engage said stud, substantially as described.

F. A. ERRINGTON.

Witnesses:
E. J. EHLERS,
D. J. WILSON.